(12) United States Patent
Yang

(10) Patent No.: US 12,526,964 B2
(45) Date of Patent: Jan. 13, 2026

(54) HEAT DISSIPATION MODULE

(71) Applicant: CLEVO CO., New Taipei (TW)

(72) Inventor: Chi-Hsueh Yang, Taipei (TW)

(73) Assignee: CLEVO CO, New Taipei (TW)

( * ) Notice: Subject to any disclaimer, the term of this patent is extended or adjusted under 35 U.S.C. 154(b) by 205 days.

(21) Appl. No.: 18/142,882

(22) Filed: May 3, 2023

(65) Prior Publication Data

US 2023/0363115 A1   Nov. 9, 2023

(30) Foreign Application Priority Data

May 6, 2022   (TW) .................................. 111204653

(51) Int. Cl.
*G06F 1/20*   (2006.01)
*H05K 7/20*   (2006.01)

(52) U.S. Cl.
CPC ........... *H05K 7/20518* (2013.01); *G06F 1/20* (2013.01)

(58) Field of Classification Search
CPC .. H05K 7/20518; H05K 7/20436; G06F 1/20; H01L 23/367
USPC ......................................................... 361/704
See application file for complete search history.

(56) References Cited

U.S. PATENT DOCUMENTS

| | | | | |
|---|---|---|---|---|
| 10,859,330 | B1 * | 12/2020 | Cola | H02S 40/42 |
| 2005/0217825 | A1 * | 10/2005 | Chern | H01L 23/3672 165/185 |
| 2019/0137195 | A1 * | 5/2019 | Arata | H05K 7/20 |
| 2020/0137876 | A1 * | 4/2020 | Spitzner | H01L 23/10 |
| 2021/0063099 | A1 * | 3/2021 | Cola | H05K 7/20409 |
| 2024/0074122 | A1 * | 2/2024 | Sanda | H05K 7/20418 |

FOREIGN PATENT DOCUMENTS

| | | | | |
|---|---|---|---|---|
| EP | 1901350 A1 * | 3/2008 | | H01L 23/36 |
| KR | 100554096 B1 * | 2/2006 | | H05K 7/20263 |
| WO | WO-2009110045 A1 * | 9/2009 | | H01L 23/047 |

* cited by examiner

Primary Examiner — Mandeep S Buttar
Assistant Examiner — Kyle Oxenknecht
(74) Attorney, Agent, or Firm — Li & Cai Intellectual Property Office

(57) ABSTRACT

A heat dissipation module is provided. The heat dissipation module includes a heat dissipating sheet and a heat conduction member. The heat dissipating sheet has a first surface and a second surface. The heat conduction member is disposed on the first surface of the heat dissipating sheet, and the second surface of the heat dissipating sheet is configured to be arranged adjacent to a periphery of a heating source. At least a part of a surface of the heat conduction member that is adjacent to the first surface has an uneven surface.

7 Claims, 6 Drawing Sheets

HEAT DISSIPATION MODULE

CROSS-REFERENCE TO RELATED PATENT APPLICATION

This application claims the benefit of priority to Taiwan Patent Application No. 111204653, filed on May 6, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a heat dissipation module, and more particularly to a leak-proof heat dissipation module for a metal heat conductor.

BACKGROUND OF THE DISCLOSURE

Currently, common electronic components are developed and designed in the direction of miniaturization. In addition, central processing unit (CPU) or graphics processing unit (GPU) components are prone to generate high heat during actual operation due to factors such as miniaturization and greatly increased performance, which affects overall operational performance. Therefore, it is necessary to use micro-vapor chamber for heat dissipation.

The existing heat dissipation structure is disposed on the electronic components through a heat sink, and then a fan unit is adopted to guide the air flow to transfer the heat energy generated by the electronic components to the outside of the casing. However, due to the tight arrangement of the components in the casing, the heat energy generated by the heat generating source cannot be effectively transferred to the outside, resulting in an effect of temperature rise in the casing. In addition, the accumulation of the heat energy forms a vicious cycle. Accordingly, if the temperature in the casing cannot be maintained within a normal range, reliability and service life of the entire electronic device will be affected. Moreover, it may cause problems of electrical leakage and over-temperature during overclocking.

In addition, due to the development of CPU manufacturing process toward nano process, and in order to improve the operation performance and optimize the power saving effect, under the high performance (i.e., turbo function) operation, certain parts of CPU core may generate extremely high heat energy, resulting in a rapid rise of CPU temperature. Accordingly, it may cause the problem of broken metal heat sink. Moreover, the uneven locations of the heat generating source may also unstable heat dissipation.

Therefore, how to improve a structural design of a heat dissipation structure so as to overcome the above issues, has become one of the important issues to be addressed in the related field.

SUMMARY OF THE DISCLOSURE

In response to the above-referenced technical inadequacies, the present disclosure provides a heat dissipation module.

In order to solve the above-mentioned problems, one of the technical aspects adopted by the present disclosure is to provide a heat dissipation module, which includes a heat dissipating sheet and a heat conduction member. The heat dissipating sheet has a first surface and a second surface. The heat conduction member is disposed on the first surface of the heat dissipating sheet, and the second surface of the heat dissipating sheet is configured to be arranged adjacent to a periphery of a heat generating source. At least a part of one surface of the heat conduction member that is adjacent to the first surface has an uneven surface.

In one of the possible or preferred embodiments, the heat dissipating sheet has a first state and a second state.

In one of the possible or preferred embodiments, the uneven surface has at least one projection.

In one of the possible or preferred embodiments, an upper surface of the uneven surface is circular, square, triangle, or polygonal.

In one of the possible or preferred embodiments, a number of the projection is multiple, and the multiple projections are arranged in at least one row on the one surface of the heat conduction member that is adjacent to the first surface.

In one of the possible or preferred embodiments, the number of the projection is multiple, and the multiple projections are arranged in a rectangular array or a circular array on the one surface of the heat conduction member that is adjacent to the first surface.

In one of the possible or preferred embodiments, the uneven surface has at least one recess.

In one of the possible or preferred embodiments, a number of the recess is multiple, and the multiple recesses are arranged in at least one row on the one surface of the heat conduction member that is adjacent to the first surface.

In one of the possible or preferred embodiments, the number of the recess is multiple, and the multiple recesses are arranged in a rectangular array or a circular array on the one surface of the heat conduction member that is adjacent to the first surface.

In one of the possible or preferred embodiments, the heat dissipation module further includes a heat dissipating assembly disposed on another surface other than the one surface of the heat conduction member that is adjacent to the first surface.

Therefore, in the heat dissipation module provided by the present disclosure, by virtue of "the heat dissipating sheet having the first surface and the second surface, the heat conduction member being disposed on the first surface of the heat dissipating sheet, and the second surface of the heat dissipating sheet being configured to be arranged adjacent to the periphery of the heat generating source" and "at least a part of the surface of the heat conduction member that is adjacent to the first surface having the uneven surface," a problem of underclocking of high-power chips during operation can be avoided and a stability of heat dissipation during repetitive testing can be improved. Furthermore, the heat dissipation module provided by the present disclosure can also reduce a breakage of metal heat sink due to uneven heating position of the heat generating sources and rapid temperature change.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
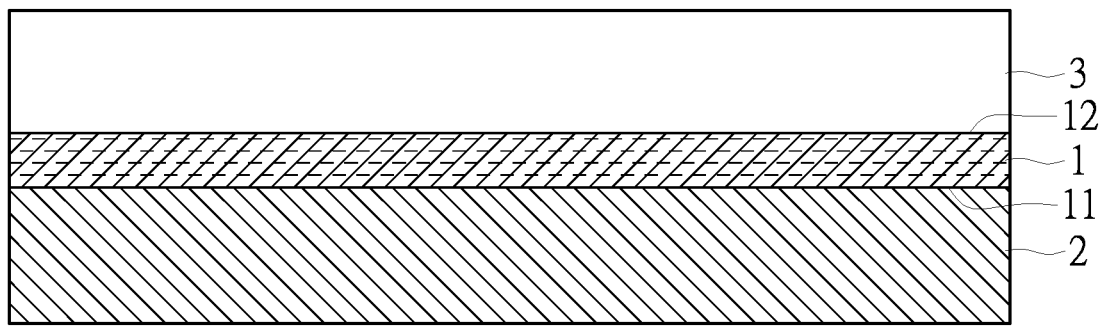
FIG. 1 is a schematic side view of a heat dissipation module according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, a first embodiment of the present disclosure provides a heat dissipation module, which includes a heat dissipating sheet 1 and a heat conduction member 2. The heat dissipating sheet 1 has a first surface 11 and a second surface 12. The heat conduction member 2 is disposed on the first surface 11 of the heat dissipating sheet 1, and the second surface 12 of the heat dissipating sheet 1 is configured to be arranged adjacent to a periphery of a heat generating source 3.

The heat dissipating sheet 1 can include a heat dissipating material with a high thermal dissipation coefficient, and has a first state and a second state. For example, the first state can be a solid state and the second state can be a liquid state, but the present disclosure is not limited thereto. Specifically, when the heat dissipating sheet 1 absorbs heat energy generated during an operation of the heat generating source 3, the heat dissipating sheet 1 can transform form the first state to the second state (e.g., from the solid state to the liquid state). In one particular embodiment, the heat dissipating sheet 1 can be formed of liquid metal. In addition, a size and a shape of the heat dissipating sheet 1 can be adjusted according to practical applications or a size as well as a shape of the heat generating source 3, but the present disclosure is not limited thereto.

A material of the heat conduction member 2 can be metal or non-metal with highly thermal conductivity. In one particular embodiment, the material of the heat conduction member 2 is metal with highly thermal conductivity, such as, but not limited to, copper, copper alloy, aluminum, aluminum alloy, gold, gold alloy, silver, and silver alloy. In addition, a size and a shape of the heat conduction member 2 can be adjusted according to practical applications or a size as well as a shape of the heat dissipating sheet 1, but the present disclosure is not limited thereto.

Figure 2:
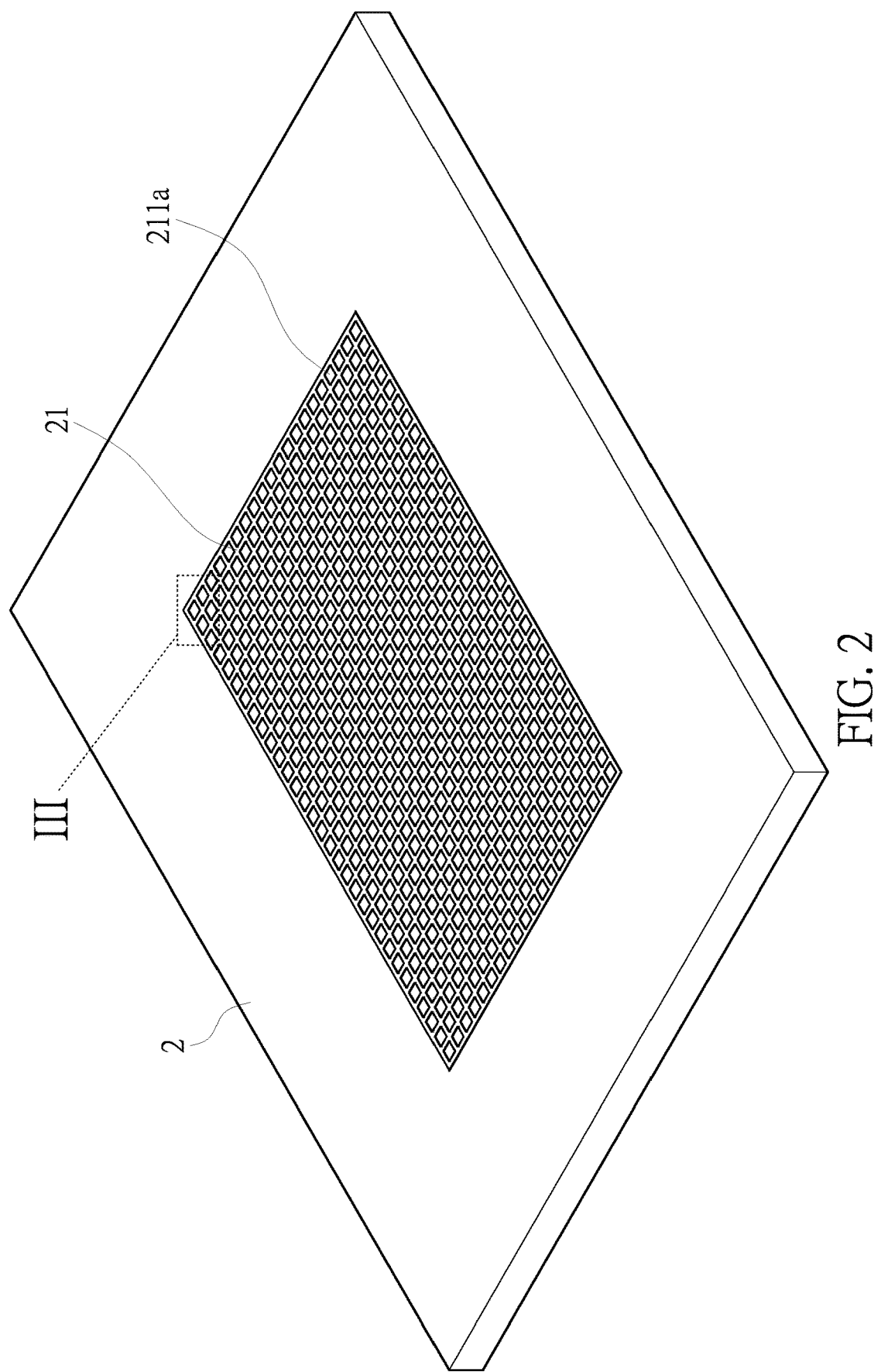
FIG. 2 is a schematic view of an uneven surface of a heat conduction member according to the first embodiment of the present disclosure.
Figure 3:
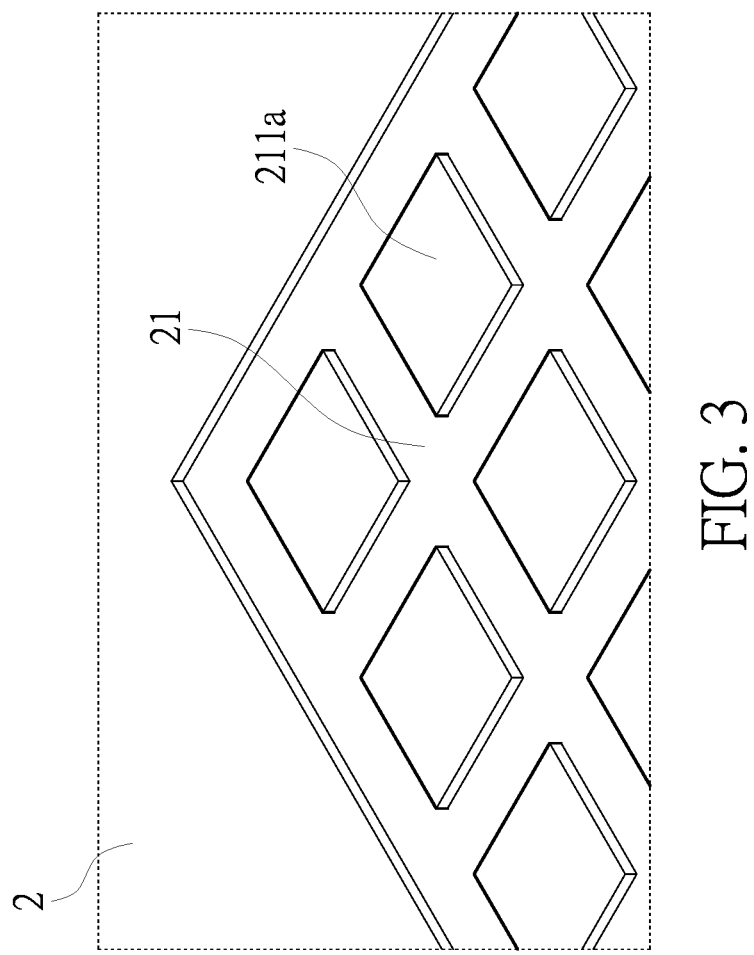
FIG. 3 is a schematic enlarged view of part III of FIG. 2.

Further, at least a part of a surface the heat conduction member 2 that is adjacent to the heat dissipating sheet 1 has an uneven surface 21. The uneven surface 21 can be arranged on the surface of the heat conduction member 2 that is adjacent to and corresponds to the heat dissipating sheet 1, and a shape and a size of the uneven surface 21 can be adjusted according the practical applications. In the present embodiment, as shown in FIG. 2 and FIG. 3, the uneven surface 21 can have at least one projection 211a. The projection 211a can protrude from the surface of the heat conduction member 2 that is adjacent to the heat dissipating sheet 1. Alternatively, the projection 211a can be formed by forming a depression in a direction away from the heat dissipating sheet 1 to surround the surface of the heat conduction member 2 that is adjacent to the heat dissipating sheet 1. In addition, a shape of the projection 211a can be, for example, but not limited to, circular, square, triangular, polygonal, etc., when viewed from above the surface of the heat conduction member 2 that is adjacent to the heat dissipating sheet 1. It should be noted that a height of the projection 211a can be adjusted according to the practical applications, but the present disclosure is not limited thereto. In one particular embodiment, the shape of the projection 211a is square and the projection 211a has a width. Preferably, the width of the projection 211a is 0.3 mm to 1.5 mm. In addition, the height of the projection 211a is preferably 0.02 mm to 0.12 mm.

Further, the projections 211a can be arranged on the uneven surface 21 with a predetermined pattern. For example, the predetermined pattern can be a rectangular array or a circular array, but the present disclosure is not limited thereto. In one particular embodiment, as shown in FIG. 2 and FIG. 3, a number of the projections 211a can be multiple, and the multiple projections 211a can be arranged in at least one row on the surface of the heat conduction member 2 that is adjacent to the heat dissipating sheet 1, with each row of the projections 211a being provided in an equally spaced manner. In addition, when the multiple projections 211a are arranged in multiple rows on the surface of the heat conduction member 2 that is adjacent to the heat dissipating sheet 1, each row can be arranged in parallel with each other in the equally spaced manner, resulting in a rectangular array arrangement.

The heat generating source 3 can be a central processing unit (CPU), a graphics processing unit (GPU), a microcontroller (MCU), a microprocessor (MPU), or an application specific integrated circuit (ASIC), but the present disclosure is not limited thereto. It is worth mentioning that the heat generating source 3 can have multiple cores for operation. That is, a heating location of the heat generating source 3 can be not limited to a certain part of the heat generating source 3 or the overall heat generating source 3, and a high temperature can be correspondingly generated at several specific locations of the heat generating source 3.

However, the aforementioned details are disclosed for exemplary purposes only, and are not meant to limit the scope of the present disclosure.

Second Embodiment

Figure 4:
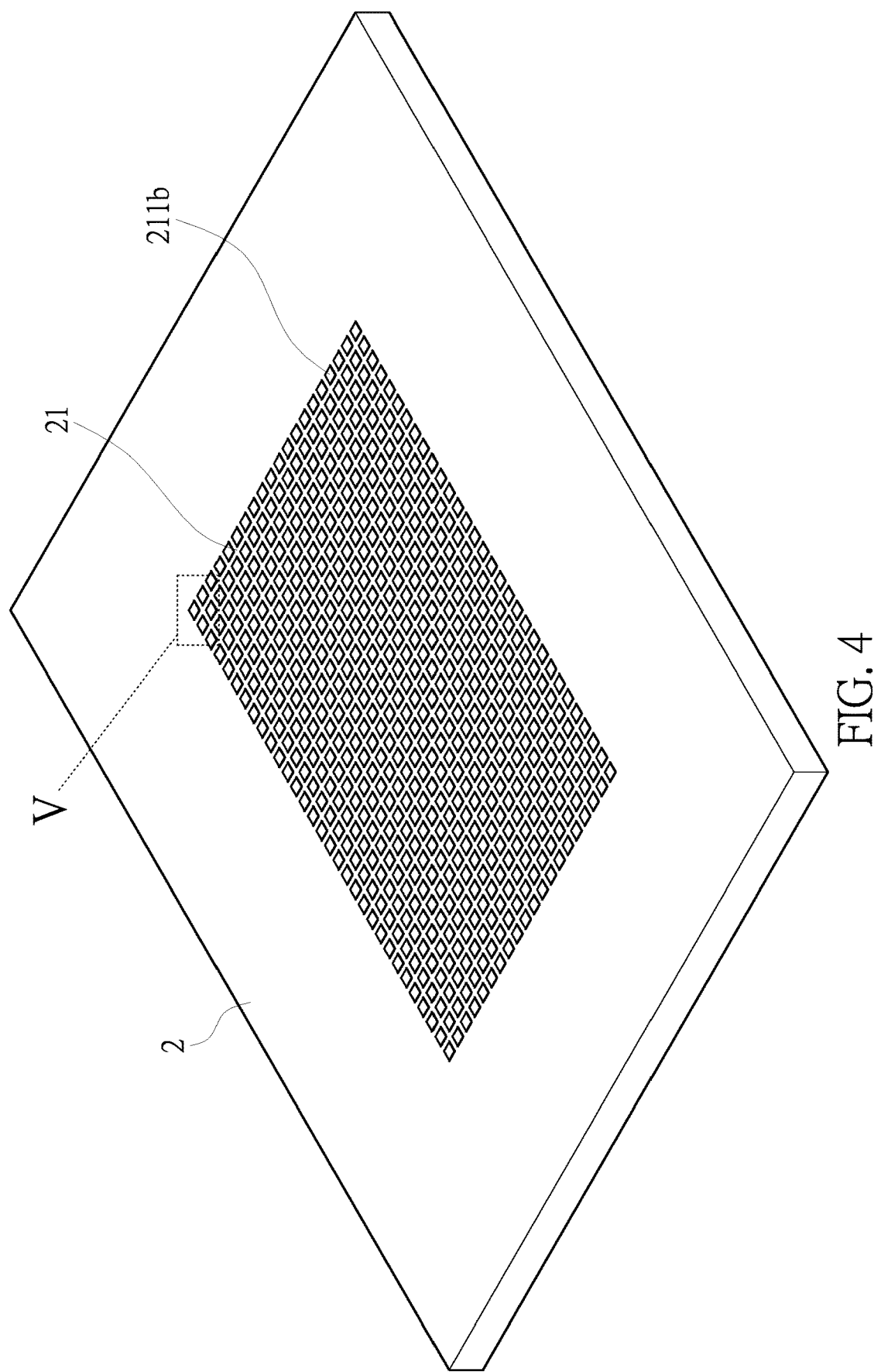
FIG. 4 is schematic view of an uneven surface of a heat conduction member according to a second embodiment of the present disclosure.
Figure 5:
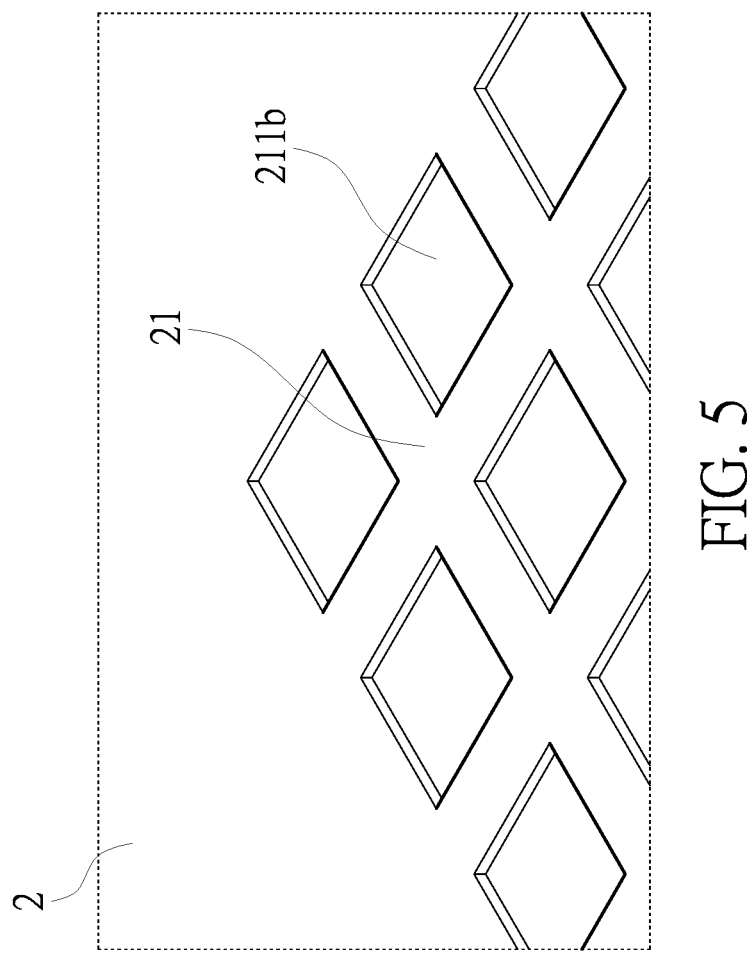
FIG. 5 is a schematic enlarged view of part V of FIG. 4.

Referring to FIG. 4 and FIG. 5, FIG. 4 is a schematic view of an uneven surface according to a second embodiment of the present disclosure. The main difference between the second embodiment and the first embodiment is that the uneven surface 21 of the second embodiment has at least one recess. In addition, it should be noted that other configurations of the second embodiment are similar to those of the first embodiment, and will not be reiterated herein.

Specifically, in the present embodiment, as shown in FIG. 4 and FIG. 5, the uneven surface 21 can have at least one recess 211*b*. The surface of the heat conduction member 2 that is adjacent to the heat dissipating sheet 1 can be recessed to form the recess 211*b*. Alternatively, the recess 211*b* can be formed by forming a protrusion in a direction away toward the heat dissipating sheet 1 to surround the surface of the heat conduction member 2 that is adjacent to the heat dissipating sheet 1. In addition, a shape of the recess 211*b* can be, for example, but not limited to, circular, square, triangular, polygonal, etc., when viewed from above the surface of the heat conduction member 2 that is adjacent to the heat dissipating sheet 1. It should be noted that a depth of the recess 211*b* can be adjusted according to the practical applications, but the present disclosure is not limited thereto. In one particular embodiment, the shape of the recess 211*b* is square and the recess 211*b* has a width. Preferably, the width of the recess 211*b* is 0.3 mm to 1.5 mm. In addition, the depth of the recess 211*b* is preferably 0.02 mm to 0.12 mm.

Further, the recesses 211*b* can be arranged on the uneven surface 21 with a predetermined pattern. For example, the predetermined pattern can be a rectangular array or a circular array, but the present disclosure is not limited thereto. In one particular embodiment, as shown in FIG. 4 and FIG. 5, a number of the recesses 211*b* can be multiple, and the multiple recesses 211*b* can be arranged in at least one row on the surface of the heat conduction member 2 that is adjacent to the heat dissipating sheet 1, with each row of the recesses 211*b* being provided in an equally spaced manner. In addition, when the multiple recesses 211*b* are arranged in multiple rows on the surface of the heat conduction member 2 that is adjacent to the heat dissipating sheet 1, each row can be arranged in parallel with each other in the equally spaced manner, resulting in a rectangular array arrangement.

However, the aforementioned details are disclosed for exemplary purposes only, and are not meant to limit the scope of the present disclosure.

Third Embodiment

Figure 6:
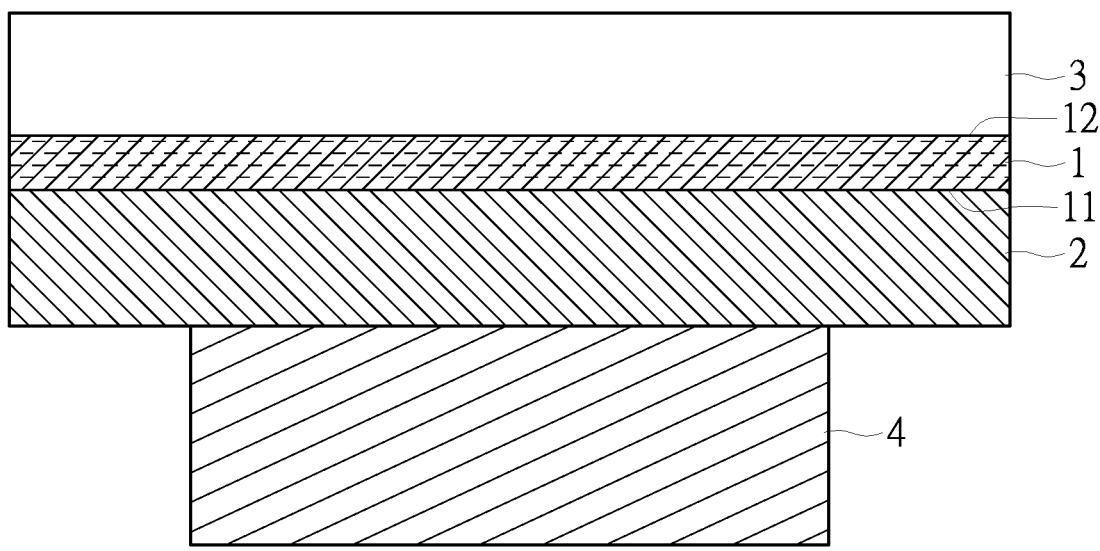
FIG. 6 is a schematic side view of a heat dissipation module according to a third embodiment of the present disclosure.

Referring to FIG. 6, FIG. 6 is a schematic side view of a heat dissipation module according to a third embodiment of the present disclosure. The main difference between the third embodiment and the first embodiment is that the heat dissipation module of the third embodiment also includes a heat dissipating assembly. In addition, it should be noted that other configurations of the third embodiment are similar to those of the first embodiment and the second embodiment, and will not be reiterated herein.

As shown in FIG. 6, the heat dissipation module also includes a heat dissipating assembly 4. The heat dissipating assembly 4 can be disposed on other surfaces of the heat conduction member 2 than the surface of the heat conduction member 2 that is adjacent to the heat dissipating sheet 1. In one particular embodiment, the heat dissipating assembly 4 is disposed on another surface of the heat dissipation member 2 that is away form the heat dissipating sheet 1, that is, the heat dissipating assembly 4 and the heat dissipating sheet 1 are respectively disposed on opposite surfaces of the heat dissipation member 2.

Further, the heat energy generated by the heat generating source 3 can be transferred through the heat dissipating assembly 4. The heat dissipating assembly 4 can be a heat dissipation fin, a heat sink, or a water cooling module, as long as the heat dissipation effect can be achieved in the heat dissipation module, but the present disclosure is not limited thereto.

[Beneficial Effects of the Embodiments]

In conclusion, in the heat dissipation module provided by the present disclosure, by virtue of "the heat dissipating sheet having the first surface and the second surface, the heat conduction member being disposed on the first surface of the heat dissipating sheet, and the second surface of the heat dissipating sheet being configured to be arranged adjacent to the periphery of the heat generating source" and "at least a part of the surface of the heat conduction member that is adjacent to the first surface having the uneven surface," a problem of underclocking of high-power chips during operation can be avoided and a stability of heat dissipation during repetitive testing can be improved. Furthermore, the heat dissipation module provided by the present disclosure can also reduce a breakage of metal heat sink due to uneven heating position of the heat generating sources and rapid temperature change.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A heat dissipation module, comprising:
   a heat dissipating sheet having a first surface and a second surface; and
   a heat conduction member disposed on the first surface of the heat dissipating sheet;
   wherein the second surface of the heat dissipating sheet is configured to be arranged adjacent to a periphery of a heat generating source;

wherein at least a part of one surface of the heat conduction member that is adjacent to the first surface has an uneven surface;

wherein the heat dissipating sheet is formed of liquid metal;

wherein a plurality of projections is disposed on the uneven surface of the heat conduction member, each of the projections protruding from the uneven surface toward the heat dissipating sheet; and wherein, in a first direction, adjacent projections are spaced apart by a first pitch, and in a second direction, adjacent projections are spaced apart by a second pitch equal to the first pitch, the first direction and the second direction being coplanar and orthogonal to each other, such that the plurality of projections form a rectangular array.

2. The heat dissipation module according to claim 1, wherein the heat dissipating sheet has a first state and a second state.

3. The heat dissipation module according to claim 1, wherein an upper surface of the uneven surface is circular, square, triangle, or polygonal.

4. The heat dissipation module according to claim 1, wherein a width of each of the projections is 0.3 mm to 1.5 mm.

5. The heat dissipation module according to claim 1, wherein a height of each of the projections is 0.02 mm to 0.12 mm.

6. The heat dissipation module according to claim 1, wherein a width of each of the projections is 0.3 mm to 1.5 mm, and a height of each of the projections is 0.02 mm to 0.12 mm.

7. The heat dissipation module according to claim 1, further comprising:

a heat dissipating assembly disposed on another surface of the heat conduction member opposite to the one surface that is adjacent to the first surface.

* * * * *